United States Patent
Splitz et al.

(10) Patent No.: US 10,051,346 B2
(45) Date of Patent: Aug. 14, 2018

(54) DATA COMMUNICATION USING A PRIVATE PREAMBLE

(71) Applicant: Mueller International, LLC, Atlanta, GA (US)

(72) Inventors: David Edwin Splitz, Sandwich, MA (US); Dale McLeod Magley, Middleboro, MA (US); Brent Dukes, Raynham, MA (US); Robert Henry Grady, Rumford, RI (US); Hassan Ali, Baintree, MA (US); Edward C. Parish, North Reading, MA (US)

(73) Assignee: Mueller International, LLC, Atlanta, GA (US)

( * ) Notice: Subject to any disclaimer, the term of this patent is extended or adjusted under 35 U.S.C. 154(b) by 226 days.

(21) Appl. No.: 14/741,821

(22) Filed: Jun. 17, 2015

(65) Prior Publication Data

US 2016/0373940 A1   Dec. 22, 2016

(51) Int. Cl.
| | | |
|---|---|---|
| *H04Q 9/00* | (2006.01) | |
| *H04L 29/06* | (2006.01) | |
| *H04L 29/08* | (2006.01) | |
| *H04W 84/18* | (2009.01) | |

(52) U.S. Cl.
CPC ............ *H04Q 9/00* (2013.01); *H04L 29/0653* (2013.01); *H04L 69/22* (2013.01); *H04L 67/12* (2013.01); *H04Q 2209/40* (2013.01); *H04Q 2209/50* (2013.01); *H04Q 2209/60* (2013.01); *H04W 84/18* (2013.01)

(58) Field of Classification Search
None
See application file for complete search history.

(56) References Cited

U.S. PATENT DOCUMENTS

| 6,370,126 | B1 | 4/2002 | De Baere et al. | |
|---|---|---|---|---|
| 9,047,756 | B2 | 6/2015 | Ali et al. | |
| 9,047,760 | B2 | 6/2015 | Ali et al. | |
| 9,423,273 | B2 | 8/2016 | Ali et al. | |
| 2005/0176416 | A1 | 8/2005 | Desch et al. | |
| 2006/0072491 | A1* | 4/2006 | Simons | H04L 29/06 |
| | | | | 370/328 |
| 2006/0155877 | A1 | 7/2006 | Hashimoto et al. | |
| 2007/0013547 | A1 | 1/2007 | Boaz | |
| 2008/0084330 | A1 | 4/2008 | Picard | |

(Continued)

FOREIGN PATENT DOCUMENTS

WO        2011123893        10/2011

OTHER PUBLICATIONS

Ali, Hassan; Corrected Notice of Allowability for U.S. Appl. No. 14/703,167, filed May 4, 2015, dated May 27, 2016, 11 pgs.

(Continued)

*Primary Examiner* — Peter Chen
(74) *Attorney, Agent, or Firm* — Taylor English Duma LLP (57) ABSTRACT

Examples of data communication using a private preamble are disclosed. In one example implementation according to aspects of the present disclosure, a data stream is detected. It is then determined whether the received data stream includes a private preamble known to the computing node. If it is determined that the data stream includes a private preamble known to the computing node, a targeted data stream intended for the computing node is received by the computing node.

16 Claims, 6 Drawing Sheets

(56) References Cited

U.S. PATENT DOCUMENTS

| | | | |
|---|---|---|---|
| 2008/0291049 A1* | 11/2008 | Meek | G01D 4/002 340/870.03 |
| 2009/0135826 A1 | 5/2009 | Kim et al. | |
| 2009/0222828 A1 | 9/2009 | Lefevre et al. | |
| 2011/0066297 A1 | 3/2011 | Saberi | |
| 2011/0298634 A1 | 12/2011 | Beverung et al. | |
| 2012/0078428 A1 | 3/2012 | Henderieckx | |
| 2012/0131324 A1 | 5/2012 | Ansari et al. | |
| 2013/0017804 A1 | 1/2013 | Jun et al. | |
| 2013/0106616 A1* | 5/2013 | Gustafsson | H04Q 9/00 340/870.02 |
| 2014/0028470 A1* | 1/2014 | Ali | G08C 15/06 340/870.03 |
| 2015/0049680 A1* | 2/2015 | Jeffery | H04W 74/0816 370/329 |
| 2015/0100856 A1* | 4/2015 | Zhang | H04L 1/0041 714/776 |
| 2015/0131705 A1* | 5/2015 | Primo | H04B 1/707 375/146 |
| 2015/0358942 A1* | 12/2015 | Uzunoglu | H04W 72/02 370/328 |
| 2016/0219024 A1* | 7/2016 | Verzun | H04L 63/102 |

OTHER PUBLICATIONS

Ali, Hassan; Notice of Allowance for US Patent Application entitled: High Traffic Data Transmission for U.S. Appl. No. 14/703,167, filed May 4, 2015; 18 pgs.

Ali, Hassan; Issue Notification for U.S. Appl. No. 14/703,167, filed May 4, 2015, dated Aug. 3, 2016, 1 pg.

Ali, Hassan; Corrected Notice of Allowability for U.S. Appl. No. 13/559,573, filed Jul. 26, 2012, dated Apr. 28, 2015, 6 pgs.

Ali, Hassan; Issue Notification for U.S. Appl. No. 13/559,573, filed Jul. 26, 2012, dated May 13, 2015, 1 pg.

Ali, Hassan; Non-Final Office Action for U.S. Appl. No. 13/559,573, filed Jul. 26, 2012, dated Sep. 22, 2014, 29 pgs.

Ali, Hassan; Notice of Allowance for U.S. Appl. No. 13/559,573, filed Jul. 26, 2012, dated Jan. 29, 2015, 15 pgs.

Ali, Hassan; U.S. Patent Application entitled: High Traffic Data Transmission for U.S. Appl. No. 13/559,573, filed Jul. 26, 2012; 28 pgs.

Ali, Hassan; U.S. Continuation Application entitled: High Traffic Data Transmission having U.S. Appl. No. 14/703,167, filed May 4, 2015, 29 pgs.

Ali, Hassan; Corrected Notice of Allowability for U.S. Appl. No. 13/559,572, filed Jul. 26, 2012, dated Feb. 6, 2015, 12 pgs.

Ali, Hassan; Corrected Notice of Allowability for U.S. Appl. No. 13/559,572, filed Jul. 26, 2012, dated Mar. 11, 2015, 8 pgs.

Ali, Hassan; Corrected Notice of Allowability for U.S. Appl. No. 13/559,572, filed Jul. 26, 2012, dated Mar. 23, 2015, 9 pgs.

Ali, Hassan; Corrected Notice of Allowability for U.S. Appl. No. 13/559,572, filed Jul. 26, 2012, dated May 6, 2015, 6 pgs.

Ali, Hassan; Issue Notification for U.S. Appl. No. 13/559,572, filed Jul. 26, 2012, dated May 13, 2015, 1 pg.

Ali, Hassan; Non-Final Office Action for U.S. Appl. No. 13/559,572, filed Jul. 26, 2012, dated Sep. 19, 2014, 34 pgs.

Ali, Hassan; Notice of Allowance for U.S. Appl. No. 13/559,572, filed Jul. 26, 2012, dated Jan. 27, 2015, 15 pgs.

Ali, Hassan; U.S. Patent Application entitled: High Traffic Data Transmission for U.S. Appl. No. 13/559,572, filed Jul. 26, 2012; 29 pgs.

Ali, Hassan; International Preliminary Report on Patentability for serial No. PCT/US2013/051607, filed on Jul. 23, 2013, dated Feb. 5, 2015, 8 pgs.

Ali, Hassan; International Search Report and Written Opinion for serial No. PCT/US13/51607, filed on Jul. 23, 2013, dated Oct. 22, 2013, 10 pgs.

Ali, Hassan; PCT Application entitled: High Traffic Data Transmission, having serial No. PCT/US13/51607, filed on Jul. 23, 2013, 28 pgs.

Edison Electric Institute. Smart Meters and Smart Meter Systems: A Metering Industry Perspective. Mar. 2011 (Mar. 2011) (Retrieved on Oct. 3, 2013) Retrieved from internet: <URL: http://www.aeic.org/meter_service/smartmetersfinal032511.pdf>.

Ali, Hassan; Non-Final Office Action for U.S. Appl. No. 14/703,167, filed May 4, 2015, dated Jan. 13, 2016, 22 pgs.

Ali, Hassan; Mexico Office Action for serial No. MX/a/2015/000867, filed Jul. 23, 2013, dated Jan. 14, 2016, 4 pgs.

Ali, Hassan; Extended European Search Report for serial No. 13823899.4, filed Jul. 23, 2013, dated Mar. 14, 2016, 10 pgs.

Braintree, Hassan Ali; Mexico Office Action for Divisional Patent Application Serial No. MX/a/2016/004093. filed Mar. 30, 2016, dated Feb. 20, 2017, 4 pgs.

Braintree, Hassan Ali; Mexico Office Action for Divisional Patent Application Serial No. MX/a/2016/004093. filed Mar. 30, 2016, dated Jun. 20, 2017, 5 pgs.

* cited by examiner

DATA COMMUNICATION USING A PRIVATE PREAMBLE

BACKGROUND

Data may be transmitted between varieties of different devices in many different ways. For example, a basic computing device, such as a personal computer may wirelessly transmit data to and/or receive data from another basic computing device via a wireless network. In another example, a utility meter (e.g., a water meter, a gas meter, and/or an electricity meter) may transmit data (e.g., consumption data, error data, firmware upgrade data, etc.) to other utility meters, collector nodes, and/or remote facilities via a wireless network.

BRIEF DESCRIPTION OF THE DRAWINGS

The following detailed description references the drawings, in which.

DETAILED DESCRIPTION

As data communication, especially wireless data communication, continues to grow, the number, size, and complexity of individual data transmission packets also continues to increase. As a result, a computing device (also referred to as computing nodes or nodes) attempting to transmit and/or receive data may encounter other data transmissions not related to or intended for the transmitting computing device (transmitting node) and/or receiving computing device (receiving node). For example, if a first utility meter desires to receive a data transmission from a second utility meter, but additional utility meters (or other non-utility meter devices) are simultaneously transmitting and receiving data, the first utility meter may be unsure which communications are intended for it and which are intended for other utility meters.

This problem is exacerbated in battery powered computing devices, such as water meters, that have a limited supply of power. In such cases, determining which messages to receive and which to ignore can consume valuable energy resources, shortening the battery life of the computing device. For example, in busy networks, a computing device may be constantly waking up to receive a hail message without knowing whether the message is intended for that node or not. This causes considerable energy loss.

It is therefore desirable to provide data communication techniques to minimize energy consumption. It is additionally desirable to provide a private preamble to enable a sending node and a receiving node to more easily and efficiently communicate data between them and among other computing nodes.

The present disclosure enables computing nodes to communicate within a private network using a private preamble. The private preamble distinguishes the start of a valid message from noise and allows a receiving node to synchronize with the transmitting node prior to more complex data being sent. In such case, valid radio frequency (RF) messages begin with a private preamble to enable a receiving node to treat any messages without the private preamble as noise. A receiving node not expecting a private preamble would treat messages with private preambles as noise. Computing nodes may also communicate with a public network using a private preamble. Additionally, the power consumption of the computing nodes may be reduces as a result of the data communication techniques disclosed herein. In particular, battery life for battery powered nodes may be extended as a result of the hailing and private preamble approach to data communication described herein. Additionally, time is saved because the receiving node need not listen to the entire message to determine whether the message is intended for the receiving node. These and other advantages will be apparent from the description that follows.

Various implementations are described below by referring to several examples of data communication using a private preamble. In one example implementation according to aspects of the present disclosure, a data stream is detected. It is then determined whether the received data stream includes a private preamble known to the computing node. If it is determined that the data stream includes a private preamble known to the computing node, a targeted data stream intended for the computing node is received by the computing node.

In another example implementation according to aspects of the present disclosure a computing node detects an incoming hailing data packet. The computing node then determines whether the incoming hailing data packet includes a known private preamble. If it is determined that the hailing data packet includes the known private preamble, the computing node receives the hailing data packet during a hailing listening period on a set of a plurality of non-frequency hopping spread spectrum (non-FHSS) channels. The computing node then receives a targeted data stream intended for the computing node.

In yet another example implementation according to aspects of the present disclosure, a computing system may include a sending node and a receiving node for communicating data. The sending node may include a hailing module configured to hail a receiving node by transmitting a hailing data packet over at least one of a set of a plurality of non-frequency hopping spread spectrum (non-FHSS) channels, the hailing data packet including a private preamble. The sending node may also include a data transmission module configured to transmit data to the receiving node after receiving a hailing acknowledgement from the receiving node. The receiving node may include a channel activity detector module configured to detect the private preamble on at least one of the set of the plurality of non-FHSS channels, to determine that the private preamble is a known private preamble, and to receive a hailing data packet during a hailing listening period on the set of the plurality of non-FHSS channels when it is determined that the private preamble is a known private preamble. The receiving node may also include an acknowledgement module configured to transmit a hailing acknowledgement to the sending node after detecting the private preamble and receiving the hailing data packet, and a data receiving module configured to receive the data transmitted by the sending node. Other examples are described in the present disclosure.

Figure 1:
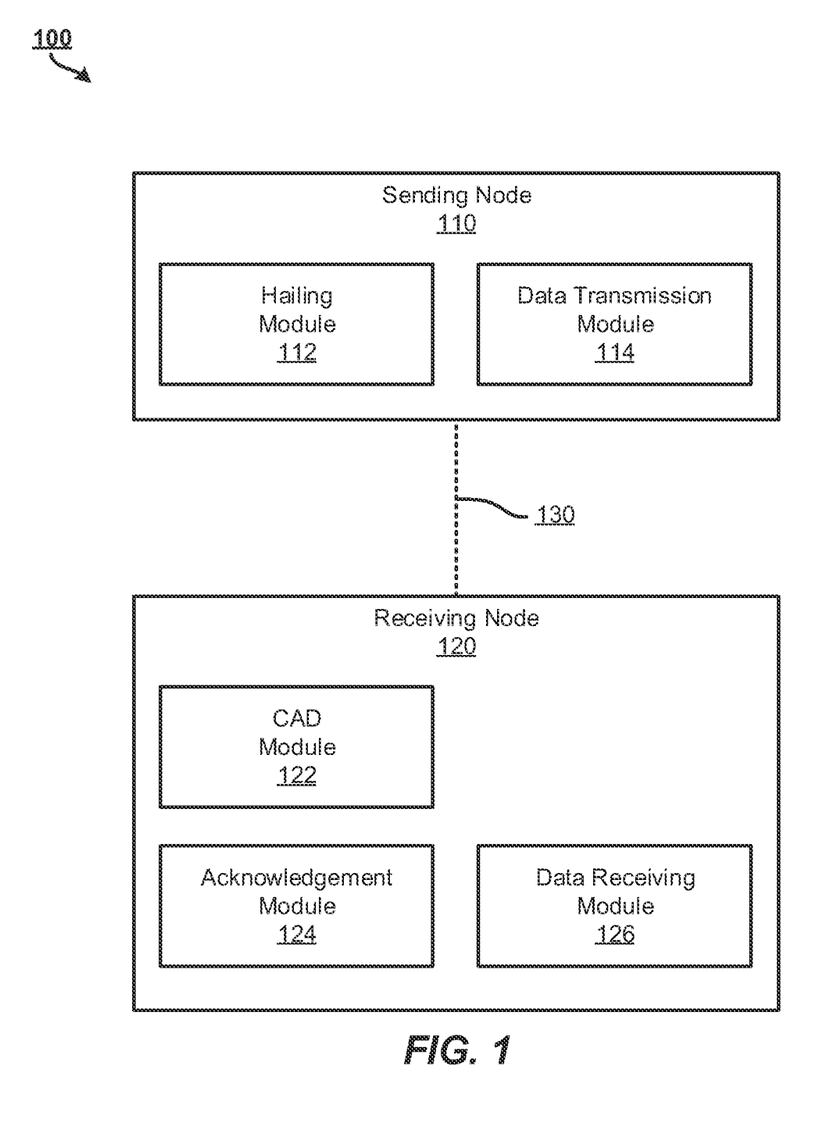
FIG. 1 illustrates a diagram of a system to send and receive data between a sending node and a receiving node using a private preamble according to examples of the present disclosure.
Figure 2:
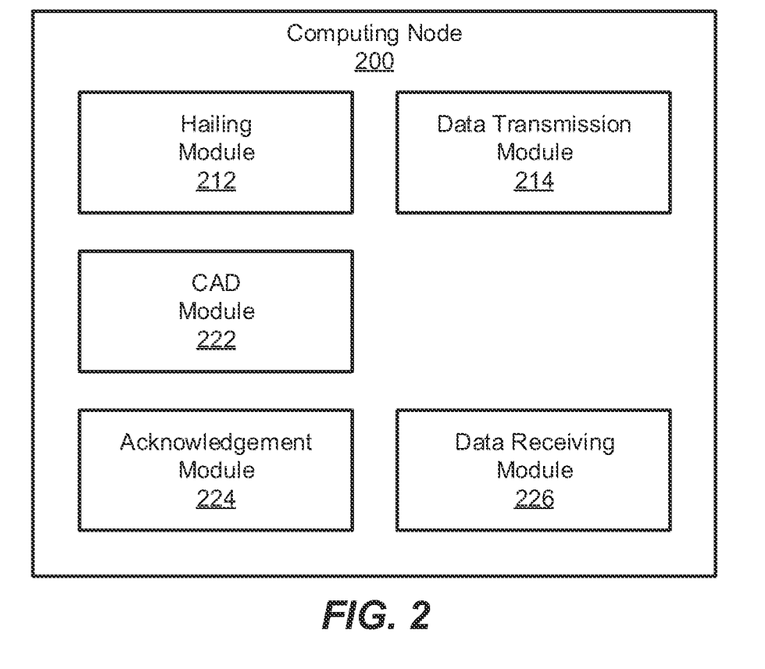
FIG. 2 illustrates a block diagram of a computing node to send and receive data using a private preamble according to examples of the present disclosure.
Figure 3:
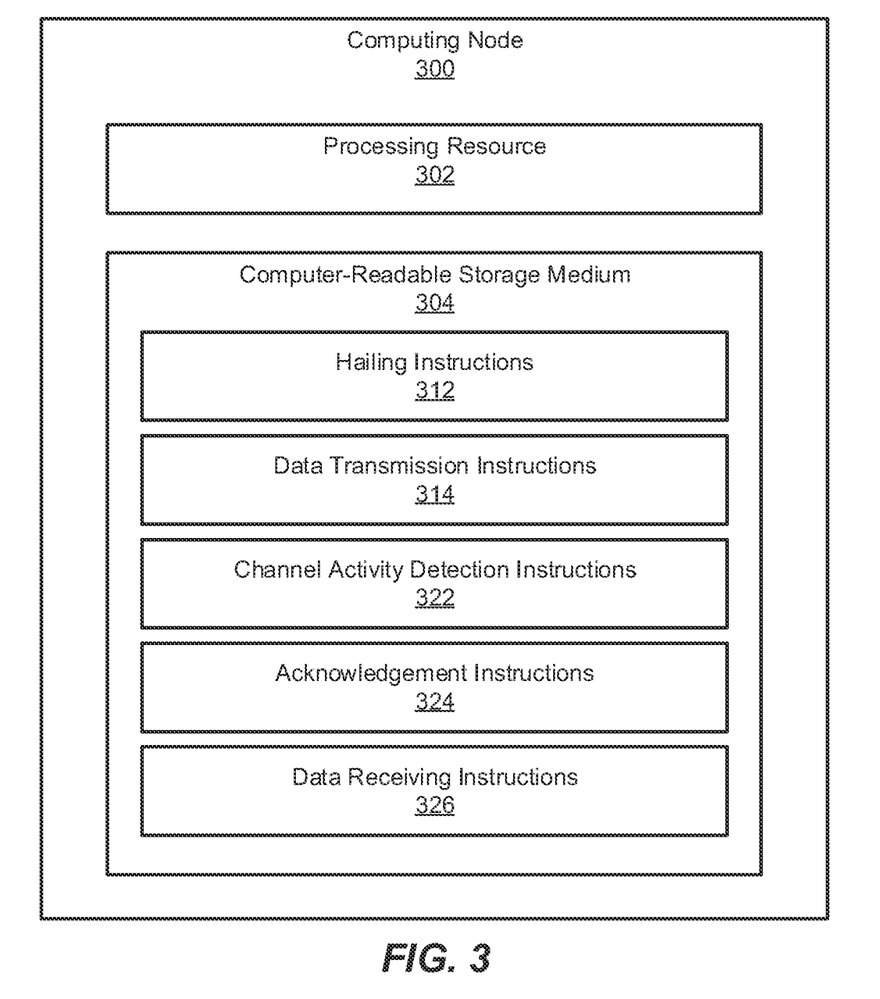
FIG. 3 illustrates a block diagram of a computing system having a computer-readable storage medium storing instructions executable by a processing resource to send and receive data using a private preamble according to examples of the present disclosure.

FIGS. 1-3 include particular components, modules, instructions, engines, etc. according to various examples as described herein. In different implementations, more, fewer, and/or other components, modules, instructions, engines, arrangements of components/modules/instructions/engines, etc. may be used according to the teachings described herein. In addition, various components, modules, engines, etc. described herein may be implemented as instructions stored on a computer-readable storage medium, hardware modules, special-purpose hardware (e.g., application specific hardware, application specific integrated circuits (ASICs), embedded controllers, hardwired circuitry, etc.), or some combination or combinations of these.

Generally, FIGS. 1-3 relate to components and modules of a computing system (also referred to herein as computing nodes or nodes), such as sending node 110 and receiving node 120 of FIG. 1, computing node 200 of FIG. 2, and computing node 300 of FIG. 3. It should be understood that sending node 110, receiving node 120, computing node 200, and computing node 300 may include any appropriate type of computing system and/or computing device, including for example smartphones, tablets, desktops, laptops, workstations, servers, smart monitors, smart televisions, digital signage, scientific instruments, retail point of sale devices, video walls, imaging devices, peripherals, networking equipment, wearable computing devices, utility meters (water meters, gas meters, and/or electricity meters), or the like.

FIG. 1 illustrates a diagram of a system 100 to send and receive data between a sending node 110 and a receiving node 120 using a private preamble according to examples of the present disclosure. In examples, sending node 110 transmits data to receiving node 120 via the network 130 using a private preamble. The private preamble represents a single symbol or a sequence of symbols (bits of data) that may be repeated at the start of a data message, including a hailing message. A private preamble may precede any valid messages, including hailing messages. The private preamble can be detected and decoded, enabling, for example, the receiving node 120 to distinguish between a valid, intended message and other data (e.g., noise, data intended for other devices, data from another network, etc.). In an example, the private preamble may represent a known sequence of symbols that may be, for example, 12 symbols, although other numbers of symbols is also possible and may be utilized in various implementations. In an example, if a symbol is a unique set of radio frequency (RF) frequencies transmitted in a certain order for a certain period of time, and if a symbol represents a fixed binary bit sequence of four bits, then a symbol mapping may be as follows:

| Bits | Symbol |
|---|---|
| 0000 | S1 |
| 0001 | S2 |
| 0010 | S3 |
| 0011 | S4 |
| 0100 | S5 |

-continued

| Bits | Symbol |
|---|---|
| 0101 | S6 |
| 0110 | S7 |
| 0111 | S8 |
| 1000 | S9 |
| 1001 | S10 |
| 1010 | S11 |
| 1011 | S12 |
| 1100 | S13 |
| 1101 | S14 |
| 1110 | S15 |
| 1111 | S16 |

Then, another unique symbol would represent a public or non-private preamble S0, so then a private preamble could be created by swapping the definition of S0 with any other symbol such as S1. In this example, the new symbol mapping would be:

| Bits | Symbol |
|---|---|
| 0000 | S0 |
| 0001 | S2 |
| 0010 | S3 |
| 0011 | S4 |
| 0100 | S5 |
| 0101 | S6 |
| 0110 | S7 |
| 0111 | S8 |
| 1000 | S9 |
| 1001 | S10 |
| 1010 | S11 |
| 1011 | S12 |
| 1100 | S13 |
| 1101 | S14 |
| 1110 | S15 |
| 1111 | S16 |

The preamble symbol would now be S1. In another example, a new unique set of RF frequencies could be defined as S17 that could be used as the preamble.

In examples, sending node 110 and receiving node 120 may represent utility meters, such as water, gas, and/or electrical meters. In an example as illustrated in FIG. 1, sending node 110 may include a hailing module 112 and a data transmission module 114. The hailing module 112 may be configured to hail a receiving node by transmitting a hailing data packet over at least one of a set of a plurality of non-frequency hopping spread spectrum (non-FHSS) channels, and the hailing data packet may include a private preamble. The hailing module 112 transmits a hail data packet (or hail message) over one of two non-FHSS channels (channel A and channel B). The two non-FHSS channels may be selected from a larger group of non-FHSS channels (e.g., 16 non-FHSS channels) that are known to both sending node 110 and receiving node 120. The transmission is described in more detail below.

The data transmission module 114 may be configured to transmit data to the receiving node after receiving a hailing acknowledgement from the receiving node. As described below, once the receiving node detects the hail message with private preamble and acknowledges such, the data transmission module 114 may transmit data to receiving node 120, such as using a sequence of FHSS channels. In examples, 50 FHSS channels may be known to both sending node 110 and receiving node 120, enabling the nodes to communicate data in packets across the channels in a known sequence, changing from one channel to the next at certain predefined time intervals.

In the example illustrated in FIG. 1, receiving node 120 may include a channel activity detector module 122, an acknowledgement module 124, and a data receiving module 126. The channel activity detection module 122 may be configured to listen for a hailing data packet during a hailing listening period on the set of the plurality of non-FHSS channels. In examples, nodes (e.g., sending node 110 and receiving node 120) may utilize a radio frequency (RF) chipset (for example, a long-range RF chipset), which may include an integrated or connected channel activity detector (CAD). The CAD can quickly assess whether any RF energy exists in a channel that matches a private preamble transmission profile. If the CAD detects the possibility of an incoming message as a result of detecting energy in a channel that matches the private preamble transmission profile, the chipset enters a receive single mode to receive data.

In examples, the channel activity detector module 122 attempts to detect the private preamble on at least one of the set of the plurality of non-FHSS channels, to determine that the private preamble is a known private preamble, and to receive a hailing data packet during a hailing listening period on the set of the plurality of non-FHSS channels when it is determined that the private preamble is a known private preamble. For example, the channel activity detector module 122 attempts to decode a valid private preamble matching the private preamble transmission profile within a specified number of symbol times (such as 5 symbol times). If the channel activity detector module 122 fails to detect a valid private preamble within the specified number of symbol times, it declares a timeout and aborts the receive operation.

However, if a valid private preamble is detected within the specified number of symbol times, then the channel activity detector module 122 may attempt to receive an incoming hail message, which may contain a node ID of the target node, a node ID of the sending node, a current time, and a start channel ID, for example. A frequency-shift key (FSK) radio protocol may be implemented. The FSK uses a flag byte to delineate the start of a hail message. The first bytes contain an address, and once the entire hail message is received, it can be determined whether the hail message is intended for the receiving node 120.

Once the hail message is received, the acknowledgement module 124 may be configured to transmit a hailing acknowledgement to sending node 110 after detecting the private preamble. The hailing acknowledgement informs sending node 110 that receiving node 120 has received the hail message and is prepared to receive data.

The data receiving module 126 may be configured to receive the data transmitted by the sending node. In examples, the data may be received on a sequence of FHSS channels, such as 50 channels in the ISM band. For example, the start channel may be indicated as being one of the 50 frequency hopping spread spectrum (FHSS) channels that the target node and the sending node initially use to exchange data. The start channel may be specified in the hail message. In other examples, non-FHSS channels may be utilized to receive the data.

The network 130 of FIG. 1, represented by a dotted line, illustrates communicative paths between sending node 110 and receiving node 120. These paths generally represent a network that may include hardware components and computers interconnected by communications channels that allow sharing of resources and information. The network may include one or more of a cable, wireless, fiber optic, or remote connection via a telecommunication link, an infrared link, a radio frequency link, or any other connectors or systems that provide electronic communication. The network may include, at least in part, an intranet, the internet, or a combination of both. The network may also include intermediate proxies, routers, switches, load balancers, and the like. The paths followed by the network between the devices (nodes) as depicted in FIG. 1 represent the logical communication paths between sending node 110 and receiving node 120, not necessarily the physical paths between the devices.

The network 130 may be a private network or may a public network through which the sending node 110 and the receiving node 120 communicate. In the case of a public network, the channel activity detection and private preamble enables a node to quickly and efficiently determine which communications are intended for it and to ignore those communications that are not so intended, saving time and power consumption.

In some examples, AC powered nodes are implemented. These AC powered nodes monitor the 50 FHSS channels for incoming hail messages. The 50 FHSS channels may be, for example, 125 kHz wide channels. It may take, for example, approximately 3.7 ms to perform a CAD on a FHSS channel. Thus, each of the 50 channels can be sampled in about 185 ms cumulatively. Hail messages used on the FHSS channels are sent with, in examples, approximately 203 ms of private preamble, which allows sufficient time for the target node to sample each of the 50 FHSS channels and detect the incoming message. After each hail message, sending node 110 (i.e., hailing node) enters a receive mode for about 20 ms, for example. During this time, receiving node 120 (i.e., target node) attempts to detect the incoming hail and send a hail response (i.e., an acknowledgement or ACK) back to the hailing node. Meanwhile, sending node 110 (i.e., hailing node) may detect an incoming hailing acknowledgment message, receive a hailing acknowledgement from receiving node 120 (i.e., target node), and complete the connection to receiving node 120 (i.e., target node).

In other examples, battery powered nodes are implemented. Unlike the AC powered nodes, the battery powered nodes may not be able to afford expending the energy to continuously monitor all 50 FHSS channels. In examples, 16 non-FHSS channels are reserved for hailing of battery powered nodes. In examples, the 16 non-FHSS channels may be 500 kHz wide channels. Each battery powered node may select two (a set) of these non-FHSS channels to monitor for incoming messages. In examples, high and medium capacity nodes may sample each of their two respective non-FHSS channels once every 750 ms. In other examples, low capacity nodes may sample their two non-FHSS channels once every 3 seconds. It may take about 3 ms to complete the CAD on both channels. Nodes hailing on the non-FHSS channels use a message with approximately 160 ms of private preamble. In such cases, the odds of a single message being detected are rather low, so the hail message is repeated several times until receiving node 120 (i.e., target node) detects and acknowledges the hail from sending node 110 (i.e., hailing node).

In examples, a battery powered node samples for incoming messages at a relatively slow rate. In order to successfully hail a battery powered node, a repeating pattern of hail messages is sent, such as by sending node 110 (i.e., hailing node). A battery powered hail pattern may include a message with approximately 160 ms of private preamble and another 20 ms of data. This is followed by approximately 22 ms where sending node 110 (i.e., hailing node) tries to receive the response (acknowledgement) from receiving node 120

Figure 6:
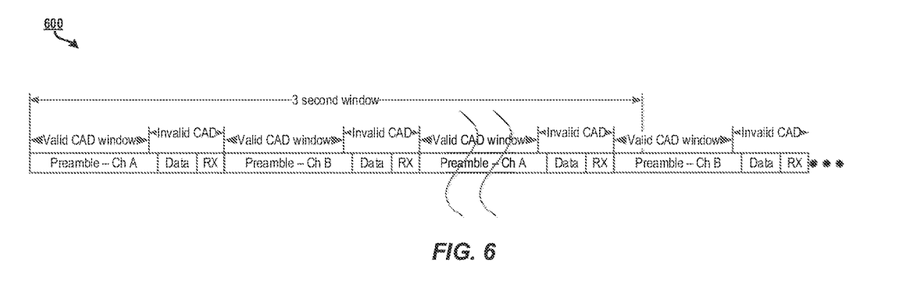
FIG. 6 illustrates a timing diagram of messages being sent alternately between two hailing channels of a computing node.

(i.e., target node). In examples, such as the timing diagram 600 illustrated in FIG. 6, the messages are sent alternating between two hailing channels of receiving node 120 (i.e., target node). The timing of the messages is such that if receiving node 120 (i.e., target node) performs a CAD during an invalid time during the first 3-second window, the next CAD will fall within a valid time during the next 3-second window, enabling a successful hail.

FIG. 2 illustrates a block diagram of a computing node 200 to send and receive data using a private preamble according to examples of the present disclosure. The computing node 200 may both send and receive data from other computing nodes. For example, if the computing node 200 is connected to a network with several other nodes, the computing node 200 may communicate data with the other nodes using the techniques described herein if the other nodes are so configured.

In this example, the computing node 200 includes a hailing module 212, a data transmission module 214, a channel activity detection module 222, an acknowledgement module 224, and a data receiving module 226. These modules may be similarly configured to the corresponding modules of sending node 110 and receiving node 120 of FIG. 1. In examples, the modules described herein may be a combination of hardware and programming instructions. The programming instructions may be processor executable instructions stored on a tangible memory resource such as a computer-readable storage medium such as computer-readable storage medium 304 of FIG. 3 or other memory resource, and the hardware may include a processing resource for executing those instructions. Thus the memory resource can be said to store program instructions that when executed by the processing resource implement the modules described herein.

Other modules may also be utilized as will be discussed further below in other examples. In different implementations, more, fewer, and/or other components, modules, instructions, and arrangements thereof may be used according to the teachings described herein, and the functionality of the modules described herein may be combined into common modules. In addition, various components, modules, etc. described herein may be implemented as computer-executable instructions, hardware modules, special-purpose hardware (e.g., application specific hardware, application specific integrated circuits (ASICs), and the like), or some combination or combinations of these. As discussed, the modules of computing node 200 may also be implemented as computer executable instructions stored on a computer-readable storage medium such as computer readable storage medium 304 of the computing system 300 illustrated in FIG. 3.

In particular, FIG. 3 illustrates a block diagram of a computing system 300 having a computer-readable storage medium 304 storing instructions 312, 314, 322, 324, 326 executable by a processing resource 302 to send and receive data using a private preamble according to examples of the present disclosure. The processing resource 302 represents generally any suitable type or form of processing unit or units capable of processing data or interpreting and executing instructions. The processing resource 302 may be one or more central processing units (CPUs), microprocessors, and/or other hardware devices suitable for retrieval and execution of instructions. The instructions may be stored, for example, on a memory resource such as computer-readable storage medium 304, which may include any electronic, magnetic, optical, or other physical storage device that store executable instructions. Thus, the memory resource may be, for example, random access memory (RAM), electrically-erasable programmable read-only memory (EEPROM), a storage drive, an optical disk, and any other suitable type of volatile or non-volatile memory that stores instructions to cause a programmable processor (i.e., processing resource) to perform the techniques described herein. In examples, the memory resource includes a main memory, such as a RAM in which the instructions may be stored during runtime, and a secondary memory, such as a nonvolatile memory in which a copy of the instructions is stored.

In this example, the memory resource is a computer-readable storage medium 304, which is non-transitory in the sense that it does not encompass a transitory signal but instead is made up of one or more memory components configured to store the instructions 312, 314, 322, 324, 326. The computer-readable storage medium 304 may be representative of a memory resource and may store machine executable instructions 312, 314, 322, 324, 326, which are executable on a computing system such as sending node 110 and receiving node 120 of FIG. 1 and/or computing node 200 of FIG. 2 as well as the computing system 300 of FIG. 3 in conjunction with processing resource 302.

In the example shown in FIG. 3, the instructions 312, 314, 322, 324, 326 may include hailing instructions 312, data transmission instructions 314, channel activity instructions 322, acknowledgement instructions 324, and data receiving instructions 326. The instructions 312, 314, 322, 324, 326 of the computer-readable storage medium 330 may be executable so as to perform the techniques described herein, including the functionality described regarding the method 400 of FIG. 4 and/or the method 500 of FIG. 5

Figure 4:
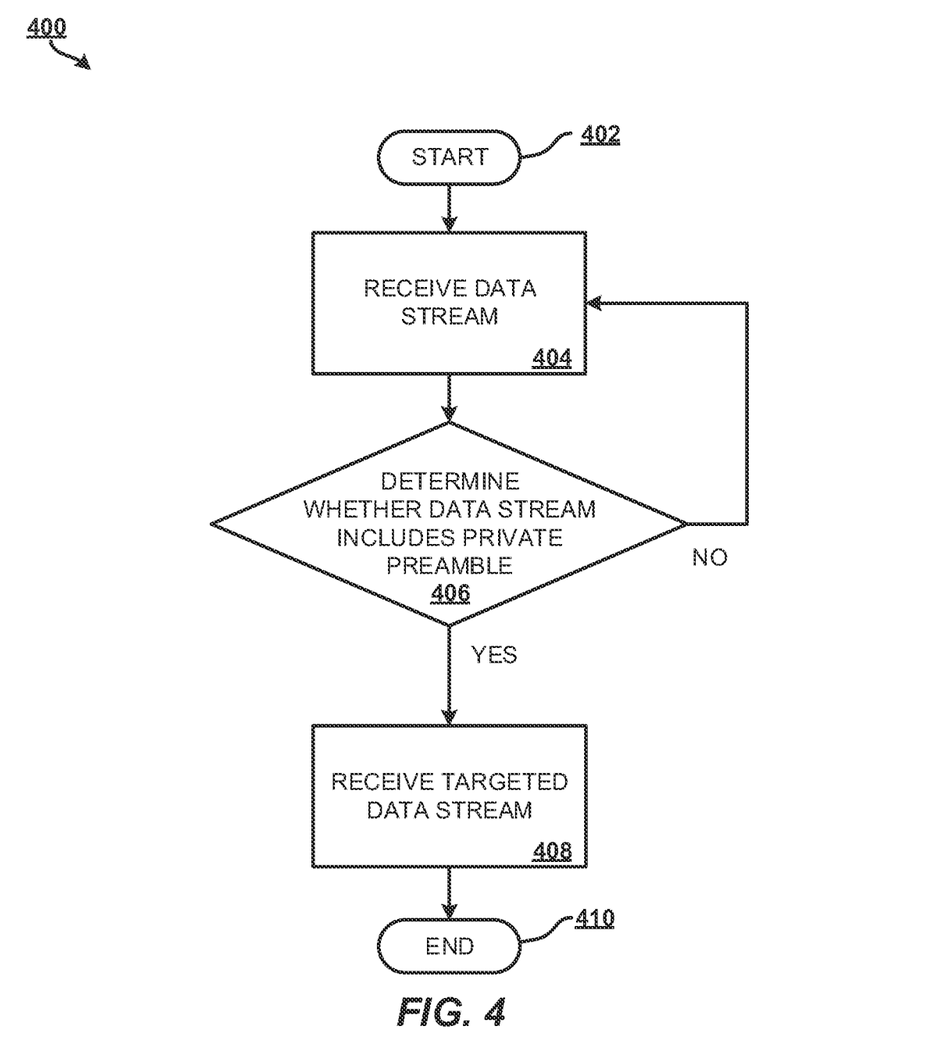
FIG. 4 illustrates a flow diagram of a method to communicate data using a private preamble according to examples of the present disclosure.

In particular, FIG. 4 illustrates a flow diagram of a method 400 to communicate data using a private preamble according to examples of the present disclosure. The method 400 may be executed by a computing system or a computing node such as sending node 110 and receiving node 120 of FIG. 1, computing node 200 of FIG. 2, and/or computing system 300 of FIG. 3. In examples, the computing node may be a water meter, a gas meter, and/or an electricity meter. The method 400 may also be stored as instructions on a non-transitory computer-readable storage medium such as computer-readable storage medium 304 of FIG. 3 that, when executed by a processing resource (e.g., processing resource 302 of FIG. 3), cause the processing resource to perform the method 400.

At block 402, the method 400 begins and continues to block 404. At block 404, the method 400 includes detecting a data stream. For example, a computing node (e.g., receiving node 120 of FIG. 1, computing node 200 of FIG. 2, and/or computing system 300 of FIG. 3) detects a data stream. The data stream may include a private preamble. In examples, the private preamble comprises a string of symbols unique to a network to which the computing node is communicatively connected. In examples, the private preamble is one of a first private preamble and a second private preamble, the first private preamble designating an upstream communication and the second private preamble designating a downstream communication. In additional examples, the first private preamble may instead designate a private network to which the computing node is communicatively connected and the second private preamble may instead designate a public network to which the computing node is communicatively connected The method 400 continues to block 406.

At block 406, the method 400 includes determining whether the data stream includes a private preamble. For example, the computing node determines whether the received data stream includes a private preamble known to the computing node. If it is determined that the data stream includes a private preamble, the method 400 continues to block 408.

At block 408, the method 400 includes receiving a targeted data stream. For example, the computing node receives a targeted data stream that is intended for the computing node. The targeted data stream may be a hail message that the computing node may analyze to determine whether the hail message is intended for the computing node. In another example, the targeted data stream may include substantive data communication such as meter consumption data, alert or alarm data, or the like. The method 400 continues to block 410 and terminates.

If, however, at block 406 it is determined that the data stream does not include a private preamble known to the computing device, the method 400 returns to block 404. For example, if it is determined that the data stream does not include a private preamble known to the computing node, the computing node may continue detecting additional data streams. The method 400 may also include the computing node determining whether any of the additional data streams include the private preamble known to the computing device. If it is determined that one of the additional data streams includes a private preamble known to the computing node, the computing node may receive the targeted data stream intended for the computing node.

Additional processes also may be included, and it should be understood that the processes depicted in FIG. 4 represent illustrations, and that other processes may be added or existing processes may be removed, modified, or rearranged without departing from the scope and spirit of the present disclosure.

Figure 5:
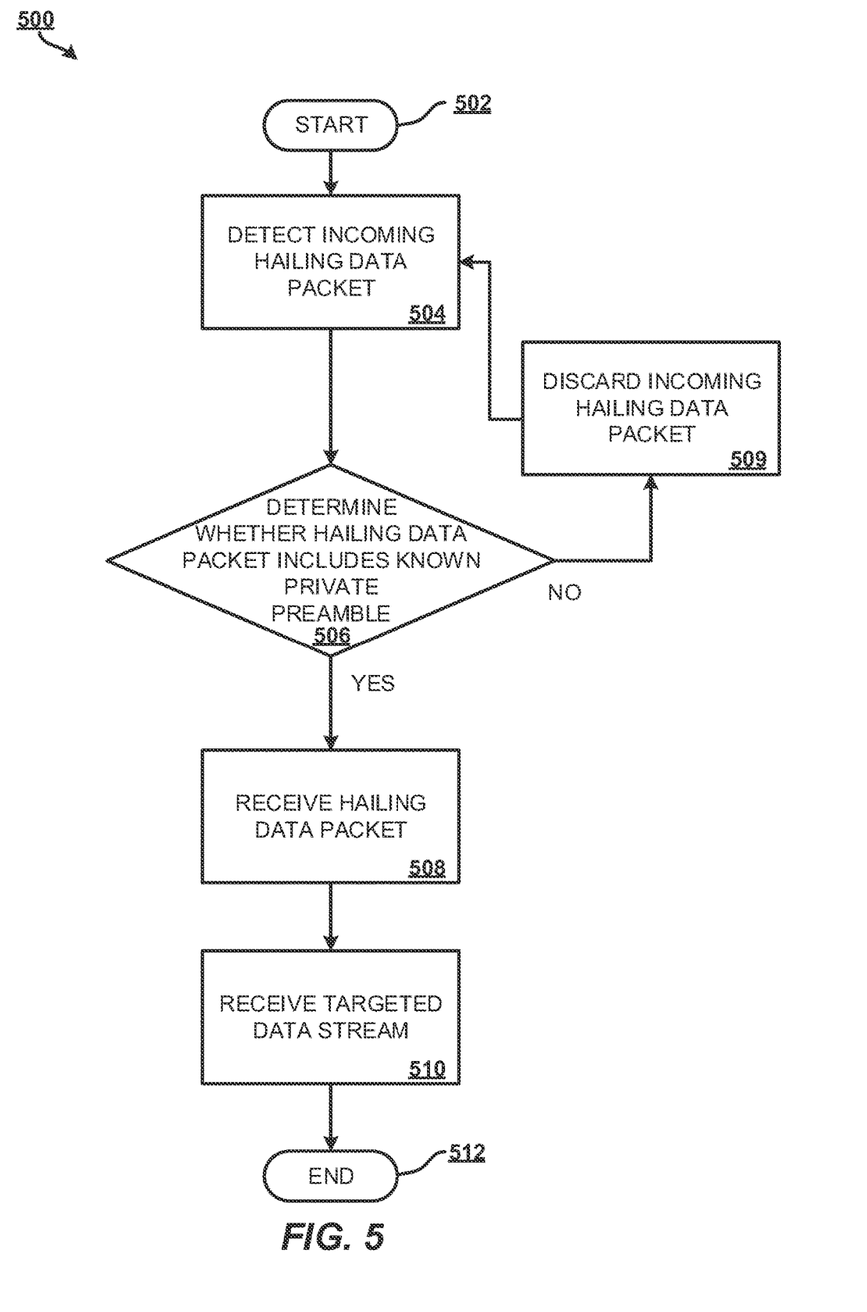
FIG. 5 illustrates a flow diagram of a method to communicate data using a private preamble and hailing techniques according to examples of the present disclosure.

In particular, FIG. 5 illustrates a flow diagram of a method 500 to communicate data using a private preamble and hailing techniques according to examples of the present disclosure. The method 500 may be executed by a computing system or a computing device such as sending node 110 and receiving node 120 of FIG. 1, computing node 200 of FIG. 2, and/or computing system 300 of FIG. 3. The method 500 may also be stored as instructions on a non-transitory computer-readable storage medium such as computer-readable storage medium 304 of FIG. 3 that, when executed by a processing resource (e.g., processing resource 302 of FIG. 3), cause the processing resource to perform the method 500.

At block 502, the method 500 begins and continues to block 504. At block 504, the method 500 includes detecting an incoming hailing data packet. For example, a computing node (e.g., receiving node 120 of FIG. 1, computing node 200 of FIG. 2, and/or computing system 300 of FIG. 3) detects an incoming hailing data packet. For battery powered nodes, the detecting may occur approximately every 3 seconds, for example, while for non-battery powered nodes, the detecting may occur approximately every 750 milliseconds, for example. The method 500 continues to block 506.

At block 506, the method 500 includes determining whether the incoming hailing data packet includes a known private preamble. For example, the computing node determines whether the incoming hailing data packet includes a known private preamble. If it is determined that the hailing data packet includes the known private preamble, the method 500 continues to block 508.

At block 508, the method 500 includes receiving the hailing data packet. For example, the computing node, receives the hailing data packet during a hailing listening period on a set of a plurality of non-frequency hopping spread spectrum (non-FHSS) channels. In examples, the plurality of non-FHSS channels may include 16 non-FHSS channels. The method 500 continues to block 510.

At block 510, the method 500 includes receiving a targeted data stream. For example, the computing node receives a targeted data stream intended for the computing node. In examples, receiving the targeted data stream may occur on one of a plurality of frequency hopping spread spectrum (FHSS) channels. In some examples, the plurality of FHSS channels may include 50 FHSS channels. The targeted data stream may be a substantive data communication that includes, for example, utility consumption data, alert or alarm data, and the like. The method 500 continues to block 512 and terminates.

If, however, at block 506, it is determined that the hailing data packet does not include the known private preamble, the computing node may discard the hailing data packet. The computing node may continue to detect an additional incoming hailing data packet at block 504.

Additional processes also may be included, and it should be understood that the processes depicted in FIG. 5 represent illustrations, and that other processes may be added or existing processes may be removed, modified, or rearranged without departing from the scope and spirit of the present disclosure.

It should be emphasized that the above-described examples are merely possible examples of implementations and set forth for a clear understanding of the present disclosure. Many variations and modifications may be made to the above-described examples without departing substantially from the spirit and principles of the present disclosure. Further, the scope of the present disclosure is intended to cover any and all appropriate combinations and sub-combinations of all elements, features, and aspects discussed above. All such appropriate modifications and variations are intended to be included within the scope of the present disclosure, and all possible claims to individual aspects or combinations of elements or steps are intended to be supported by the present disclosure.

What is claimed is:
1. A method, comprising:
   detecting, by a channel activity detector in a computing node having a private preamble transmission profile that includes a predefined radio frequency (RF) channel energy level and a predefined symbol sequence, whether an incoming communication is being sent on a non-frequency hopping spread spectrum (non-FHSS) channel having an RF energy level that matches the predefined RF channel energy level, wherein a symbol comprises a bit sequence corresponding to a set of radio frequencies transmitted in a predetermined sequence for a predetermined time period;
   responsive to a determination by the channel activity detector that the RF energy level of the communication matches the predefined RF channel energy level, determining, by the channel activity detector, whether the communication comprises a hail message with a valid preamble by determining whether the communication contains a symbol sequence matching the predefined symbol sequence;
   responsive to a determination by the channel activity detector that the communication comprises a hail message with a valid preamble, determining, by the channel activity detector, whether the hail message is intended for the computing node by receiving data contained within the hail message; and responsive to a determination by the channel activity detector that the hail message is intended for the computing node
  receiving, by the computing node, a targeted data stream intended for the computing node, and
  sending, by the computing node, an acknowledgement signal to a sending node from which the hail message was received.

2. The method of claim 1, wherein the detecting occurs approximately every 750 milliseconds.

3. The method of claim 1, wherein the non-FHSS channel is one in a group of 16 non-FHSS channels.

4. The method of claim 1, further comprising:
  responsive to a determination by the channel activity detector that the communication does not comprise a hail message with a valid preamble, declaring a timeout and aborting a receive operation.

5. The method of claim 1, wherein receiving, by the computing node, the targeted data stream intended for the computing node comprises receiving the targeted data stream on one of a plurality of frequency hopping spread spectrum (FHSS) channels.

6. The method of claim 5, wherein the plurality of FHSS channels comprises 50 FHSS channels.

7. The method of claim 1, wherein the detecting occurs approximately every 3 seconds.

8. The method of claim 1, wherein receiving data contained within the hail message comprises receiving at least one of a node identification (ID) of the computing node, a current time, and a start channel ID.

9. The method of claim 1, wherein subsequent to a determination by the channel activity detector that the communication comprises a hail message with a valid preamble, determining, by the channel activity detector, that the valid preamble designates one of an upstream communication and a downstream communication.

10. A computing system, comprising:
  a sending node having a private preamble transmission profile that includes a predefined radio frequency (RF) channel energy level and a predefined symbol sequence, wherein a symbol comprises a bit sequence corresponding to a set of radio frequencies transmitted in a predetermined sequence for a predetermined time period; and
  a receiving node;
  wherein the sending node further comprises
    a hailing module configured to hail the receiving node by transmitting a hail message, the hail message comprising a preamble and a hailing data packet, over at least one of a set of a plurality of non-frequency hopping spread spectrum (non-FHSS) channels, and
    a data transmission module configured to transmit data to the receiving node after receiving a hailing acknowledgement from the receiving node; and
  wherein the receiving node further comprises
    a channel activity detector configured to
      determine whether an incoming communication is being sent on a non-FHSS channel having an RF energy level that matches the predefined RF channel energy level,
      responsive to determining that the RF energy level of the communication matches the predefined RF channel energy level, determine whether the communication comprises a hail message with a valid preamble by determining whether the communication contains a symbol sequence matching the predefined symbol sequence, and
      responsive to determining that the communication comprises a hail message with a valid preamble, determine whether the hail message is intended for the receiving node by receiving the hailing data packet in the hail message,
    an acknowledgement module configured to transmit the hailing acknowledgement to the sending node after receiving the hailing data packet, and
    a data receiving module configured to receive the data transmitted by the sending node.

11. The system of claim 10, wherein the channel activity detector is further configured to, responsive to a determination that the communication does not comprise a hail message with a valid preamble, declaring a timeout and aborting a receive operation.

12. The system of claim 10, wherein the hailing data packet further comprises a node ID of the receiving node, a node ID of the sending node, a current time, and a start channel ID.

13. The system of claim 12, wherein the data receiving module is further configured to receive the data transmitted by the sending node on one of a plurality of frequency hopping spread spectrum (FHSS) channels beginning with the channel identified by the start channel ID.

14. The system of claim 13, wherein the non-FHSS channels are 125 kHz wide channels and wherein the FHSS channels are 500 kHz wide channels.

15. The system of claim 10, wherein the channel activity detector is further configured to, subsequent to determining that the communication comprises a hail message with a valid preamble, determining that the valid preamble designates one of an upstream communication and a downstream communication.

16. A method, comprising
  detecting, by a channel activity detector in a computing node having a private preamble transmission profile that includes a predefined radio frequency (RF) channel energy level and a predefined symbol sequence, whether an incoming communication is being sent on a frequency hopping spread spectrum (FHSS) channel having an RF energy level that matches the predefined RF channel energy level, wherein a symbol comprises a bit sequence corresponding to a set of radio frequencies transmitted in a predetermined sequence for a predetermined time period;
  responsive to a determination by the channel activity detector that the RF energy level of the communication matches the predefined RF channel energy level, determining, by the channel activity detector, whether the communication comprises a hail message with a valid preamble by determining whether the communication contains a symbol sequence matching the predefined symbol sequence;
  responsive to a determination by the channel activity detector that the communication comprises a hail message with a valid preamble, determining, by the channel activity detector, whether the hail message is intended for the computing node by receiving data contained within the hail message; and
  responsive to a determination by the channel activity detector that the hail message is intended for the computing node
    receiving, by the computing node, a targeted data stream intended for the computing node, and sending, by the computing node, an acknowledgement signal to a sending node from which the hail message was received.

* * * * *